United States Patent [19]
Wilson

[11] Patent Number: 4,917,362
[45] Date of Patent: Apr. 17, 1990

[54] AUTOMATIC WIRE PULLER

[75] Inventor: Bruce Wilson, 3912 Mohawk St., Pasadena, Calif. 91107

[73] Assignee: Bruce Wilson, Pasadena, Calif.

[21] Appl. No.: 320,972

[22] Filed: Mar. 9, 1989

[51] Int. Cl.⁴ .......................................... B65H 57/28
[52] U.S. Cl. ........................................ 254/139.3 FT
[58] Field of Search ............... 254/134.3 R, 134.3 FT, 254/294–296, 286, 382; 15/109.35 N, 104.3 R; 242/158 R, 54 R; 226/99, 51

[56] References Cited

U.S. PATENT DOCUMENTS

| | | |
|---|---|---|
| 1,956,806 | 5/1934 | Mitzen et al. |
| 2,718,376 | 9/1955 | Raney ................. 254/134.3 FT |
| 3,070,355 | 12/1962 | Wyatt. |
| 3,145,972 | 8/1964 | Sweeney. |
| 4,413,808 | 11/1983 | Finkle ................. 254/139.3 FT |
| 4,458,880 | 7/1984 | Conti ................... 254/134.3 FT |
| 4,497,470 | 2/1985 | Carter et al. |
| 4,728,079 | 3/1988 | Nitta et al. ........... 254/134.3 FT |

FOREIGN PATENT DOCUMENTS

556596  2/1932  Fed. Rep. of Germany.

Primary Examiner—Robert C. Watson
Attorney, Agent, or Firm—Christie, Parker & Hale

[57] ABSTRACT

The automatic wire puller of the present invention provides an apparatus allowing one electrician to pull wire through conduit sections. The wire puller employs standard fish tape reels, is directly mountable to an electric outlet box and provides a reversible drive motor for playout or take up of the fish tape. A releasable catch maintains the handle of the standard plastic fish tape reel in a stationary position during rotation of the reel holder. The invention includes a first torque sensor to disable the drive motor should the fish tape become snagged during take up and a second torque sensor to deactivate the motor if the fish tape becomes snagged during playout thereby preventing damage to the fish tape, the wire being pulled, or the conduit which could occur if continued force was applied to the snagged fish tape. A completion sensor releases the handle of the fish tape reel when take up is complete and a shut off sensor then disengages the motor drive. Local and remote control of the invention is provided to allow the electrician to operate from either end of the conduit through which the cable is being pulled to monitor and guide the pulling operation as required.

11 Claims, 7 Drawing Sheets

AUTOMATIC WIRE PULLER

FIELD OF THE INVENTION

This invention relates generally to devices for pulling wire through conduit during construction or rewiring of buildings. More particularly the invention provides an apparatus which allows one electrician to pull wire through a section of conduit using a standard fish tape reel while controlling the invention from the location of the wire entry into the conduit. Further, the invention automatically stops operation if the wire becomes snagged.

PRIOR ART

Numerous devices exist for drawing wire through conduit. Manual fish tapes such as those produced by Klein and other companies have a plastic case in which the fish tape is coiled and played out through an aperture in a handle mechanism. For wire runs of over several feet using these manual tapes, two people are required; one to pull the fish tape and one to feed the wire into the conduit to avoid snags. In addition, the physical effort to pull the tape requires significant strength.

Motorized devices such as those disclosed in U.S. Pat. Nos. 2,718,376 to Raney, 3,145,972 to Sweeney and 4,413,808 to Finkle overcome various aspects of the difficulties in pulling wire, however, each of these devices requires the operator to be located at the device to operate it. The device disclosed in U.S. Pat. No. 4,497,470 to Carter et al. allows the operator to control the device from the source of the wire being pulled but requires action by the operator to shut off the device if a snag develops. None of the devices allows the use of a conventional fish tape.

Snagging of the wire being pulled in the conduit is a significant problem. The Sweeney device makes provisions for a snag of the wire by allowing slippage of a drive belt. This type of arrangement or as disclosed in Carter, requiring the operator to monitor the cable being pulled for snags, allows the possibility of damage to the wire, conduit, or the puller if the snag goes unnoticed by the operator.

SUMMARY OF THE INVENTION

The present invention is an automatic wire puller which allows the use of standard fish tape reels. Standard fish tape reels comprise a plastic case in which the fish tape is coiled. The case is bifurcated on its outer circumference and a handle containing an aperture for the fish tape is engaged in the slot formed by the bifurcation. The fish tape is taken up or played out from the plastic case by rotating the case with respect to the handle.

The present invention provides a holder for the case of the fish tape which is rotatably mounted to a frame. A reversible drive motor rotates the reel holder in either a play-out direction or a take-up direction. A releasable catch maintains the handle of the fish tape reel in a stationary position during rotation of the reel holder, thereby allowing take-up or play-out of the fish tape from the case.

The invention includes a first torque sensor which disables the drive motor if the fish tape becomes snagged during take-up. A second torque sensor deactivates the motor if the fish tape becomes snagged during play-out. By sensing a snag and disabling the motor, the invention prevents damage to the fish tape, wire being pulled and conduit which could occur if continued force was applied to the snagged fish tape.

A completion sensor determines when take-up of the fish tape is complete. When the completion sensor is tripped, the handle catch releases on the invention, allowing rotation of the handle with the fish tape case to draw the fully retracted fish tape through a partial revolution, thereby extracting a suitable working length of wire from the conduit. A shut-off sensor then disengages the motor drive.

Control of the invention is accomplished locally through a play-out and take-up switch mounted on the frame of the invention or remotely through a cable attached control box having controls for momentary play-out and take-up or continuous play-out and take-up. The continuous play-out and take-up controls are deactivated by the first and second torque sensors to prevent damage. The momentary or "inching" controls are available to allow the operator to attempt to clear the snag by alternately inching play-out and take-up.

The invention provides an interface to accommodate standard flush or wall-mount electrical boxes. Lateral adjustment capability and rotating bearings provided by the interface for the fish tape allow positioning of the invention with respect to the conduit entry into the box to preclude binding of the fish tape or wires during withdrawal from the conduit and passage through the box into the invention.

A spring-loaded pivotally mounted base is attached to the frame to provide leveraged support for the invention against the wall for wall-hung boxes and as a floor stand for the device. An angle adaptor integral with the interface is used in combination with the base in a rotated position to allow attachment of the interface to a standard height wall plug outlet.

DETAILED DESCRIPTION OF THE INVENTION

Figure 1:
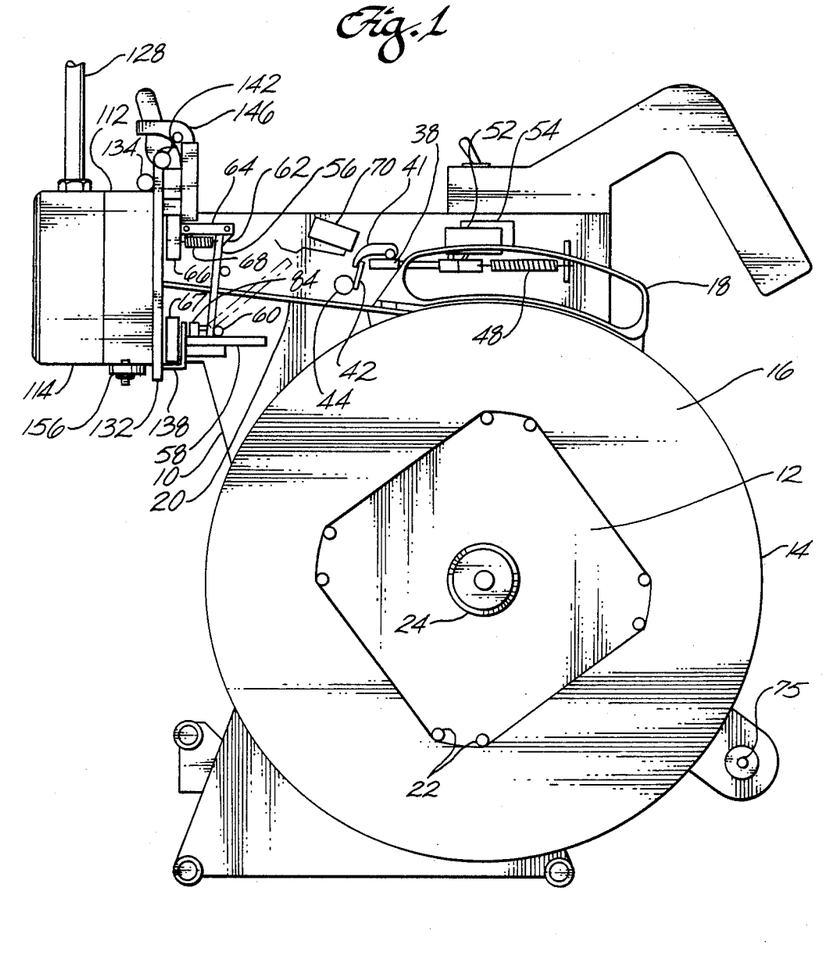
FIG. 1 is a left side view of the invention showing the fish tape reel with handle, handle catch, leader trip door, wall box interface, and base.

The invention as shown in FIG. 1 comprises a frame 10 on which a fish tape reel holder 12 is rotatably mounted. A standard fish tape 14 may be mounted on the fish tape reel holder. Standard fish tapes typically have a hard plastic case 16 in which the fish tape is coiled. The case is bifurcated around the outer circumference and a handle 18 is engaged in the slot between the halves of the case. The fish tape 20 enters the case through an aperture in the handle. The handle is held stationary and the case is rotated to play out or take up fish tape from the reel. The case is typically provided with a square, octagonal, or sawtooth edged axial aperture to facilitate rotating the cover. Pins 22 mounted in the reel holder engage the axial aperture in the fish tape case. Various pin locations may be provided to accommodate the various axial aperture configurations of differing brands of fish tape reels on the reel holder. The reel holder rotates about a bearing 24.

Figure 2:
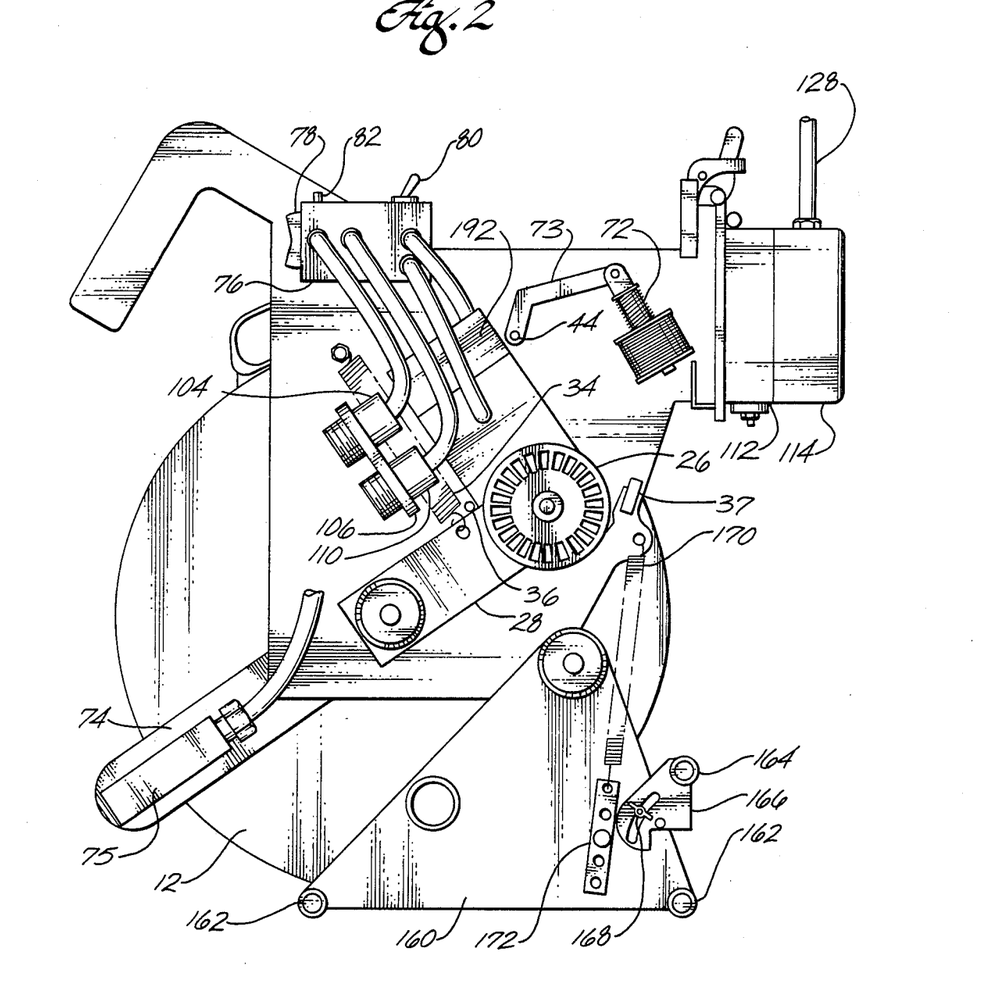
FIG. 2 is a right side view showing the reversible motor mounted to the spring-held cantilever arm, play-out torque switch, handle catch release solenoid, and base.
Figure 3:
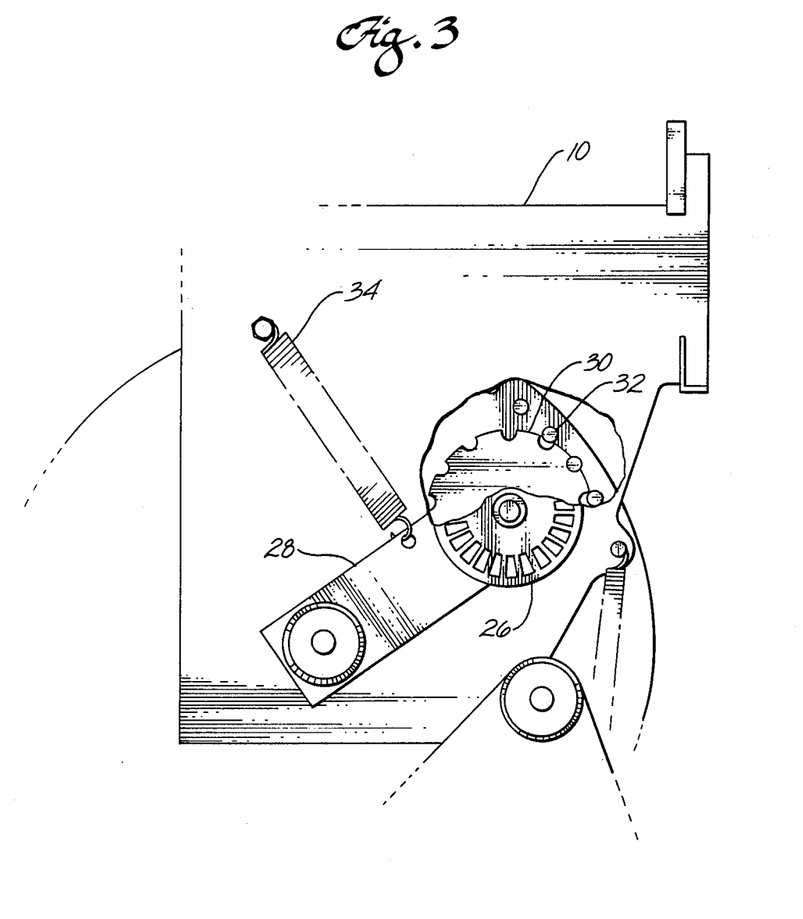
FIG. 3 is a partial cut away view of the right side showing the sprocket and planetary teeth on the drive reel and the motor support arm with tension spring.
Figure 4:
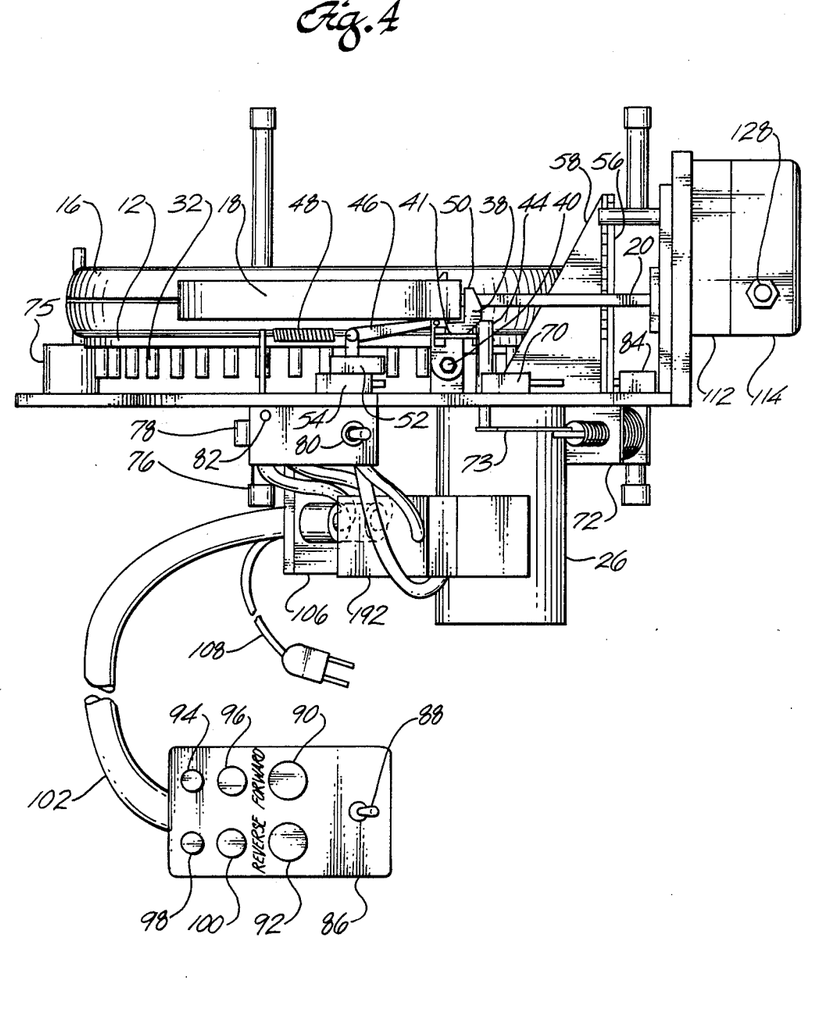
FIG. 4 is a top view showing the handle catch, local switch box, remote cable and box, and leader trip door arrangement.

A reversible electric motor is provided to rotate the reel holder. As seen in FIGS. 2, 3 and 4, the motor 26 is mounted to a cantilever arm 28. The cantilever arm is pivotally mounted on the axis of rotation of the reel holder. In the present embodiment the motor drives a sprocket 30 which engages pins 32 mounted on the reel holder. Those skilled in the art will recognize alternate planetary gear arrangements providing sufficient rotational force.

The cantilever arm mounting the motor is restrained by a spring 34 which urges the cantilevered arm against a stop 36. During operation of the device for take up of the fish tape, the reel holder rotates counterclockwise with reference to FIGS. 2 and 3. If the fish tape becomes snagged hindering rotation of the reel holder, the rotation of the sprocket will pivot the cantilever arm and extend the spring. A micro-switch 37 is mounted to the frame to engage the motor or cantilever arm when displaced as described in greater detail subsequently. Actuation of the micro-switch disables the motor to prevent damage due to the snagged fish tape. A shock absorber arrangement between the cantilever arm and the stop may be employed to prevent jarring of the arm and motor against the stop when tension in the fish tape is released.

Referring again to FIG. a releasable catch 38 holds the handle of the fish tape to prevent rotation of the handle during take up or play out of the tape from the reel. As best seen in FIG. 4, the catch is pivotally mounted on pin 40. The catch is retained in place by a pawl 41 which engages an arm 42 mounted to pin 44. An articulated link 46 urges the catch from a first closed position holding the handle to a second open position releasing the handle due to tension in spring 48. As will be described in greater detail subsequently, when take up of the fish tape is complete the catch is released by rotation of pin 44 disengaging arm 42 from the pawl. Tension on spring 48 urges the articulated link thereby rotating the catch about pin 40 to release the handle.

Similarly, when mounting the fish tape on the invention, the handle will most likely not be in alignment with the catch. When the fish tape reel is installed on the invention, the motor is energized in the play-out direction rotating the fish tape reel counterclockwise with respect to FIG. causing the handle to engage the forward jaw 50 of the catch, thereby pivoting the catch extending spring 48 through the articulated linkage and engaging arm 42 with the pawl 41.

A micro-switch 52 is attached to the frame in a position to engage the articulated linkage when the catch is in the closed position. An additional micro-switch 54 is attached to the frame. Once the catch is in the closed position, rotation of the reel holder in the counterclockwise direction with respect to FIG. 1 will play out fish tape. If the fish tape becomes snagged in the play-out direction, the fish tape handle will be urged more strongly against the forward jaw of the catch, further displacing the catch against the tension of spring 48 until the articulated linkage engages micro-switch 54. Actuation of micro-switch 54 disengages the motor in the play-out direction, as will be described in greater detail subsequently, thereby preventing damage due to the snag.

To provide a means for sensing that take up of the fish tape is complete, a slotted plate 56 is pivotally mounted to a shelf 58 employing a hinge 60. The shelf is in turn mounted to the frame. The plate is restrained in an upright or closed position by dog 62 which is pivotally mounted on arm 64 which is in turn pivotally mounted to face plate 66. A spring 68 urges the dog 62 and arm 64 against the slotted plate 56.

When take up of the fish tape is nearly complete, the leader on the end of the tape will emerge from the conduit and electrical box. The slot in plate 56 is sized to allow passage of the fish tape but captures the leader on the end of the tape. Further take up of the fish tape overcomes the force of spring 68 releasing dog 62 to allow the slotted plate to rotate about hinge 60. A micro-switch 70 is positioned on the frame to contact the slotted plate as it rotates to allow the leader to pass. Actuation of micro-switch 70 energizes a solenoid 72 as shown in FIG. 2. The solenoid retracts actuating lever 73 which rotates pin 44 to release the handle catch as previously described.

Rotation of the reel holder continues in the clockwise direction with respect to FIG. 1 causing the handle to rotate with the fish tape reel. A feeler switch 75 is tripped by the handle after the handle has rotated through a predetermined arc. Actuation of the feeler switch disengages the motor, thereby stopping rotation of the fish tape reel. Rotation of the handle and reel after release from the handle catch allows a desired length of wire to be drawn from the conduit and box to provide a working length for later connection. As shown in FIG. 2, the feeler switch in the present embodiment is attached to an arm 74 which is pivotally mounted at the axis of rotation of the reel holder. The arm may be adjusted around the axis to provide the desired arc of rotation by the handle prior to engaging the feeler switch.

The means for controlling the invention are best seen in FIG. 4. A local control box 76 is attached to the frame. A rocker switch 78 with a center off position is provided for actuation of the drive motor in the play out or take up direction. As previously described, when the handle of the fish tape reel has engaged the handle catch and moved the articulated linkage into contact with micro-switch 52, play out control from the local rocker switch is disabled. A local/remote switch 80 is provided to allow selection of control of the invention by the rocker switch or, as will be described in greater detail, subsequently by the remote control box. An indicator light 82 is connected to a micro-switch 84 which is mounted to the frame to be actuated when the slotted plate is in the upright position. Illumination of indicator light 82 informs the operator that the slotted plate is in the upright position and engaging the dog 62 and arm 64, thereby arming the completion sensor to capture the leader of the fish tape when it emerges from the electrical box.

When local/remote switch 80 is in the remote position, control of the invention is accomplished through remote control box 86. A three position switch 88 selects continuous forward operation for take up of the fish tape, continuous reverse operation for play out of the fish tape, and a third off position. In the off position, continuous operation in either forward or reverse is disabled, however, inching in either the forward or reverse direction may be accomplished. A forward push button switch 90 and a reverse push button switch 92 allow the operator to actuate continuous or inching operation of the drive motor, depending upon the position of switch 88.

A first light 94 is provided to indicate that power is available for forward actuation of the invention. A second light 96 is provided to indicate actuation of the invention in the forward direction. Depressing forward push button 90 illuminates indicator light 96. In addition, if switch 88 is in the forward continuous position, light 96 will remain illuminated during continuous forward operation as will be described in greater detail subsequently. Similarly a third light 98 is provided to indicate power available for reverse operation of the invention and fourth light 100 is provided to indicate actuation of the invention in the reverse direction.

The remote control box is connected to the invention through an extended cable 102 which in the present embodiment is attached through a screw on electrical connector 104 attached to bracket 106 which is supported from the frame. An extended power cable 108 is similarly attached to the invention through screw on electrical connector 110. The lengths of cables 102 and 108 are chosen to allow positioning of the invention remotely from the power source and to provide sufficient length for remote operation of the invention from the entry point of the wire being pulled into the conduit.

Figure 6:
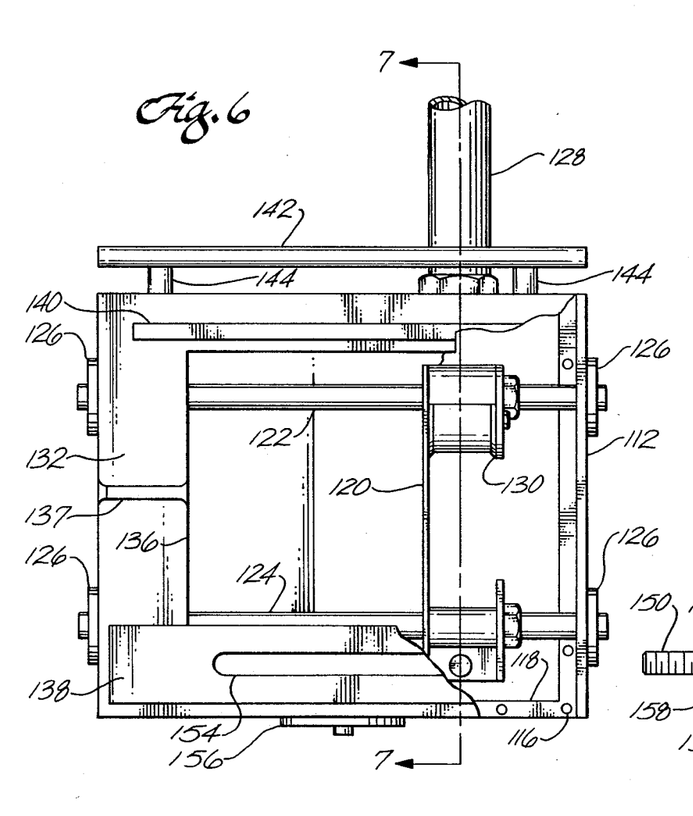
FIG. 6 is a cut away front view of the interface box adaptor.
Figure 7:
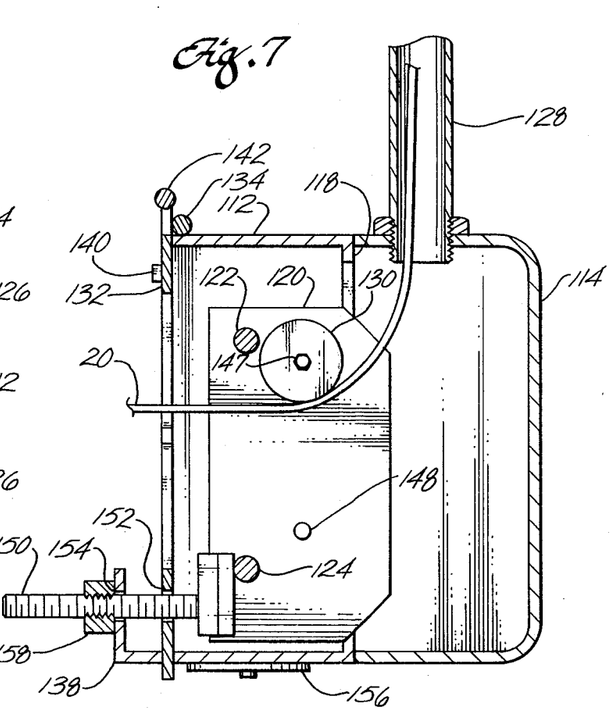
FIG. 7 is a side view cut away of the electrical box with the interface adaptor attached.

The invention provides an interface for attachment to standard flush or wall mount electrical boxes. Those skilled in the art will recognize that the embodiments disclosed herein may be easily adapted for attachment to a breaker box or subpanel as required. As seen in FIGS. 6 and 7, the interface comprises a spacer box 112 which attaches to the electrical box 114. The spacer is sized to allow attachment of the spacer to the box using available corner screw webs or tangs existing on the electrical box. Various dimensions of electrical boxes may be accommodated by appropriate location of screw holes 116 in web 118 of the spacer.

A dolly 120 is supported within the spacer by an upper transverse rod 122 and a lower transverse rod 124. The transverse rods extend through holes in the sides of the spacer and may be restrained by cam lock washers 126 or other appropriate means. The dolly is positionable on the transverse rods for alignment with the conduit 128 entering the electrical box. A roller 130 is supported by the dolly to provide a rotating bearing surface for the fish tape as it is extracted from the conduit and electrical box. Replaceable rollers of varying diameter may be attached to the dolly to accommodate electrical boxes of varying depths to prevent binding of the fish tape on the lip of the conduit or snagging of the leader and wires on the lip of the conduit when drawn through the electrical box.

A plate 132 is attached to the spacer by hinge 134. The plate contains an aperture 136 to allow the fish tape and wires to be drawn from the roller 130 through the plate. A slot 137 in the plate allows the plate to be attached to the spacer box with the fish tape already extending into the electrical box. An angle bracket 138 extends from the plate. A rest 140 extends from the plate on the opposite side of aperture 136 from bracket 138. A catch rod 142 is attached by standoffs 144 to the upper edge of the plate. As shown in FIG. 1, the frame of the invention is supported on the interface by engagement of lower face plate 67 within bracket 138 and support of upper face plate 66 against the rest 140. A clamp 146 attached to the upper face plate engages clamp rod 142 pressing upper face plate 66 against the interface plate 132.

The combination of bracket 138 and rest 140 allows the interface to be mounted to accommodate a conduit entering an electrical box horizontally by rotating the interface 90° from the position shown in FIGS. 6 and 7. The rest and bracket constrain the upper and lower face plates of the invention to rigidly support the frame of the invention in a horizontal position.

The axle 147 of the roller may be repositioned from an upper position in the dolly as shown in FIG. 7 to a lower position in the dolly in aperture 148 to accommodate conduit entering through the bottom of the electrical box. The axle may be constrained in the dolly by the use of cam washers or other appropriate means.

A positioning pin 150 is pivotally mounted to the dolly. The pin extends through a transverse slot 152 in the plate and a transverse slot 154 in the bracket. The positioning pin is received in a notch in the lower face plate 67 which properly positions the upper and lower face plates on the interface to align the fish tape reel with the conduit entering the electrical box.

The interface may be adapted for mounting the frame of the invention at an angle by pivoting the interface plate about hinge 134 and supporting the end of the plate distal from the hinge with an arm 156. In the present embodiment the arm is rotatably mounted to the bottom of the spacer box. The locator pin 150 is threaded and a knurled knob or nut 158 having a diameter greater than the width of slot 154 is provided to draw the interface plate firmly against the spacer box as shown in FIG. 7 or the pivoted arm as shown in FIG. 5.

As best seen in FIG. 2, a base 160 is pivotally attached to the frame. The base supports the invention on four feet 162 when placed on a horizontal surface. Two additional feet 164 are pivotally mounted to the base on support 166. Support 166 may be pivoted and secured using wing nut 168 to place the additional feet 164 in contact with a wall for support of the invention when suspended from a wall mounted electrical box. A balance spring 170 is connected between the base and the frame to counteract the moment due to the lateral displacement of the center of gravity of the invention from the pivot point of the base. An adjustment means 172 is provided to adjust tension on the spring. As shown in FIG. 2, the adjustment device may be a multihole bracket.

Figure 5:
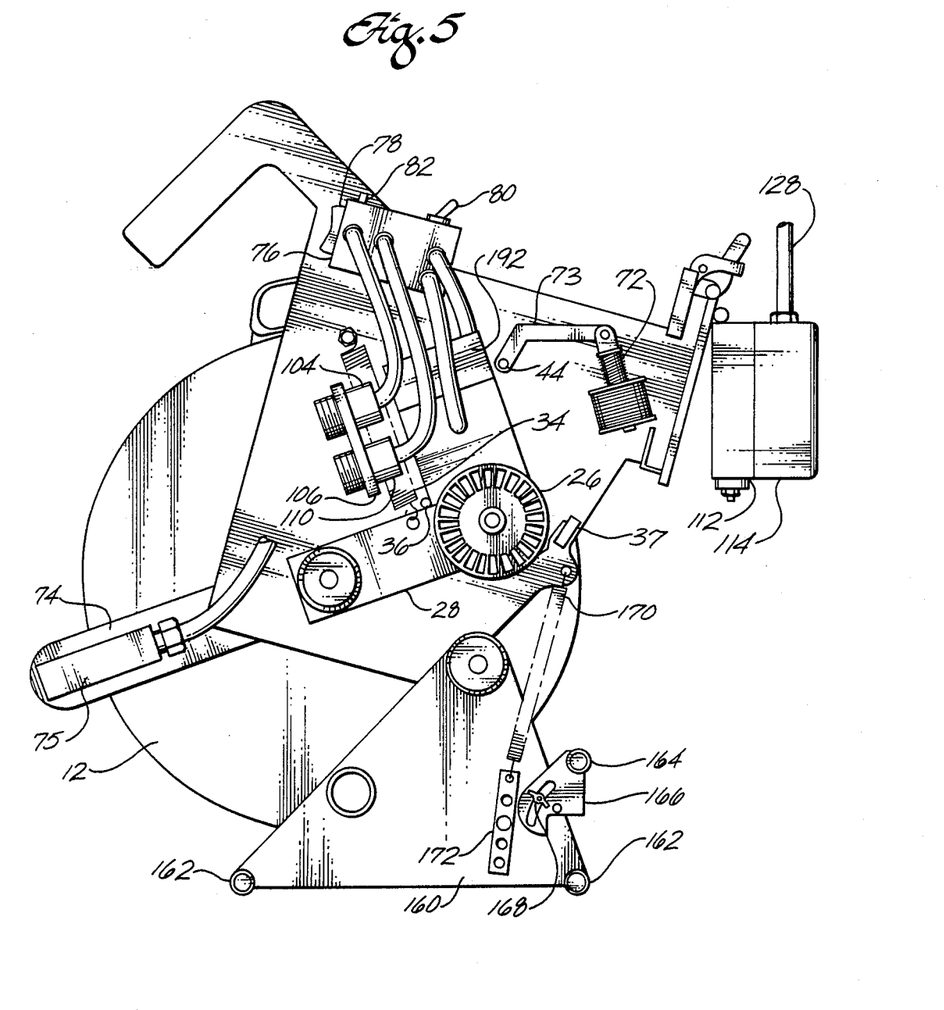
FIG. 5 is a partial right side view showing angle mounting of the invention to a standard height wall plug outlet.

As previously discussed and shown in detail in FIG. 5, the invention may be pivoted on the base to accommodate attachment at an angle to the electrical box. This allows attachment of the invention to a standard height wall outlet which is spaced above the floor a distance less than the vertical dimension of the invention.

Figure 8:
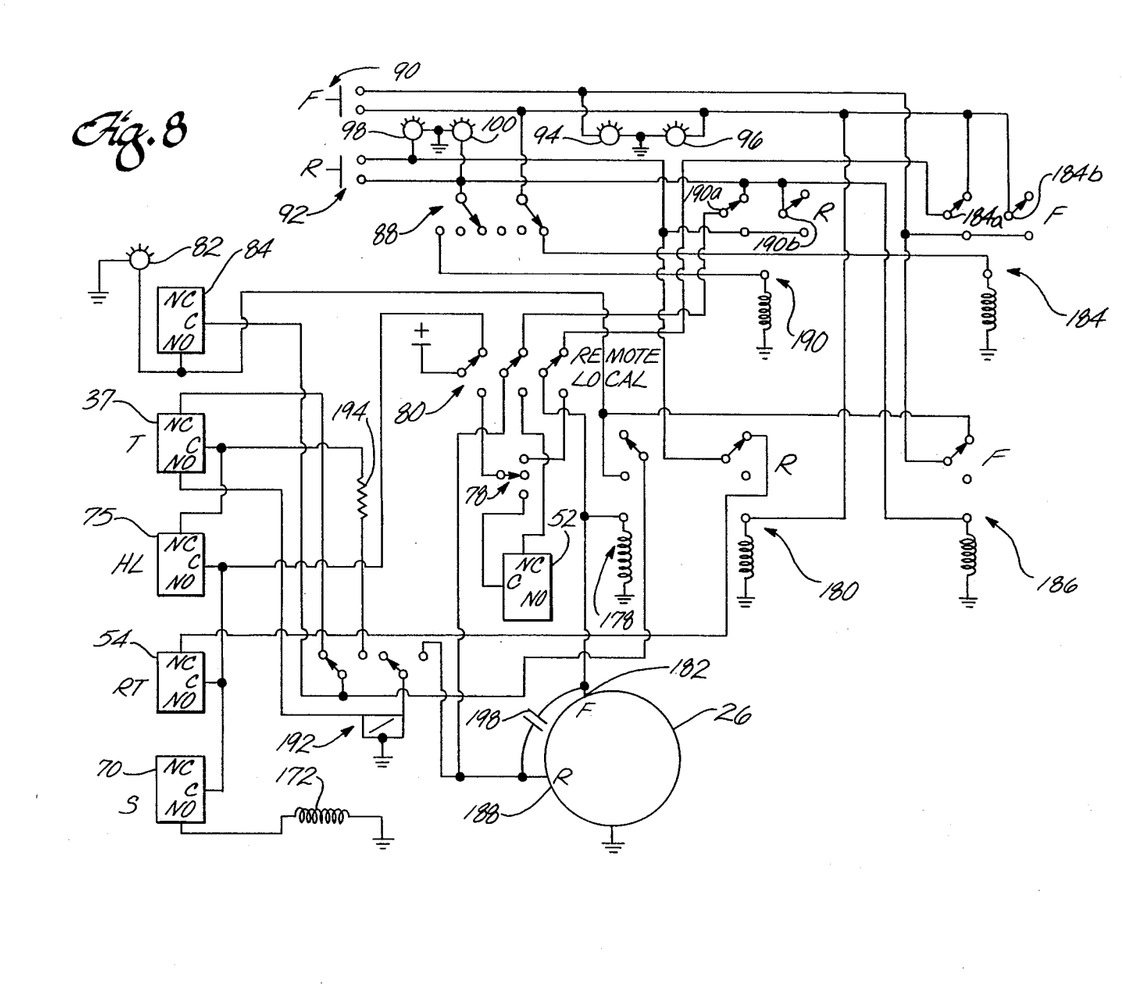
FIG. 8 is an electrical schematic of the invention.

Operation of the invention is best seen with reference to FIGS. 1 and 8. The operator attaches the interface box to the electrical box as previously described. The dolly is adjusted to align the roller with the conduit entry into the electrical box. The fish tape may be played out from the fish tape reel manually and threaded through the conduit for attachment to the wires at the beginning point for the pull. Alternately the play out features of the invention which will be discussed subsequently may be used to feed the fish tape through the conduit. The frame of the invention is mounted to the interface plate aligning the notch in lower face plate 67 with the positioning pin for proper alignment. Latch 146 is then engaged with the latching bar 142 drawing the upper face plate 66 against the interface plate and ridge 140. Power cable 108 is connected to an electrical source for powering the invention. The fish tape reel is then mounted to the reel holder using appropriate pins 22 matching the axial aperture of the case. A mating plate not shown in the drawings may be secured over the case to firmly affix the fish tape reel to the reel holder. As attached, the handle of the fish tape is not in alignment with the handle catch. The operator uses the local rocker switch 78 in the play out or reverse direction to rotate the reel holder until the handle contacts the forward lip of the handle catch which rotates into position extending the articulated linkage and spring 48 until pawl 41 engages arm 42. As the pawl engages the arm, the articulated linkage contacts micro-switch 52 removing power from the rocker switch in the play out direction. Slotted plate 56 is placed in the vertical position engaging the fish tape within the slot and latched by dog 62 and arm 64. In the latched position the slotted plate actuates micro-switch 84 illuminating indicator light 82.

The operator may then take up the fish tape using the rocker switch in the take up direction or the operator may position the local remote switch 80 in the remote position activating the remote control box 86. Cable 102 is of length sufficient to allow the operator to position the remote control box at the entry point of the wires into the conduit. With switch 80 placed in the remote position, lights 94 and 98 will be illuminated indicating power to the circuit. Switch 88 is a three-position switch (double pole, triple throw) with a center off position, a forward or take up position and a reverse or play-out position. In the off position, push buttons 90 and 92 operate in a momentary or "inching" mode. With switch 88 in the off position if the operator depresses the forward push button, single pole relay 180 is energized removing power from the reverse circuit. Power is provided to the forward pole of the motor 182 and to the coil of relay 178 through the first pole 184A of relay 184. As soon as the forward push button is released, power is removed from the motor. Similarly, if the reverse push button is depressed, relay 186 is energized removing power from the forward circuit and power is provided to the reverse pole 188 of the motor through first pole 190A of relay 190. If switch 88 is replaced in the forward position, depressing the forward push button will energize relay 184 closing the relay and providing power to the circuit through second pole 184B, thereby maintaining power to the circuit for forward motion of the motor allowing the operator to release the forward push button. Forward operation will continue until switch 88 is turned to the off or reverse position, thereby deenergizing relay 184.

Operation in the reverse mode is similar using relay 190.

When operating in the forward inching or forward continuous mode, power for the circuit is provided through micro-switches 37 and 75. If the wire or fish tape becomes snagged in the conduit causing cantilever arm 28 to actuate micro-switch 37 as previously described, power is interrupted to the motor and actuation of micro-switch 37 activates a latching relay 192 to remove power from the motor. With relay 192 in the latched position, if the operator presses the forward push button current is drawn through resistor 194 causing power light 94 to be extinguished. The operator is thereby notified that the torque switch has been activated. Depressing the reverse push button provides current to the latching relay 192 to reset the relay while reversing the motor to relax tension on the fish tape, thereby deactivating micro-switch 37. The forward push button may then again be used to activate the motor in the forward direction unless or until the forward torque sensor is again activated.

During operation in the reverse direction, power is supplied to the circuits through micro-switch 54. If the fish tape or wire becomes snagged during reverse operation, micro-switch 54 is activated as previously described, removing power from the circuit. Those skilled in the art will recognize that a latching relay and resistor configuration may be employed in the reverse circuit similar to that in the forward circuit for indication of torque switch trip and reset.

When operating in the forward mode as the wire pull nears completion, the fish tape leader exits the box and is captured by slotted plate 56. Continuing take up of the fish tape overcomes spring 68 releasing dog 62 allowing the slotted plate to rotate about hinge 60. As the slotted plates rotates, contact is made with micro-switch 70 which energizes solenoid coil 72, thereby releasing the handle catch as previously described. Relay 178 maintains power to the motor with micro-switch 84 in the open position due to actuation of the slotted plate. Continued forward rotation of the fish tape reel brings the fish tape handle into contact with feeler switch 75 which actuates removing power from the circuit extinguishing lights 94 and 96.

In the present invention latching relay 192 is mounted to the motor case as shown in FIG. 2. Those skilled in the art will recognize appropriate mounting locations for relays 178, 180, 184, 186 and 190 based on electrical and wiring considerations. In the preferred embodiment a 1/80th horsepower Dayton motor with 76.0 in-lbs of torque is employed. A balance capacitor 198 is provided for proper motor control.

Actuation of either of the torque sensors or the feeler switch disables the invention and actuation of a control by the operator is required to reenergize the motor. A release of tension on the fish tape or disengaging the fish tape reel from the invention will not cause reactivation without positive operator input thereby increasing safety.

Having now described the invention in detail as required by the patent statutes, those skilled in the art will recognize modifications to the invention as disclosed to accommodate specific needs. Those modifications fall within the scope of the present invention as defined in the following claims.

What is claimed is:

1. An automatic wire puller for use with standard fish tape reels having a play-out and take up handle, the wire puller comprising:
   a frame;
   a fish tape reel holder rotatably mounted to the frame;
   a bidirectional drive means for selectively rotating the reel holder in a play-out direction and a take up direction, the drive means having an arm pivotally mounted about the axis of rotation of the reel holder, a reversible electric motor mounted to the arm distal the pivot point, a sprocket driven by the motor, mating pins circumferentially mounted to the reel holder engaging the sprocket, and, means for constraining the arm;

means for remotely selecting the direction of operation and engaging the drive means;

means for constraining the handle of the fish tape reel;

a first torque sensing means for sensing torque on the reel holder in the take up direction, the first torque sensing means disabling the drive means if the fish tape becomes snagged during take up;

a second torque sensing means for sensing torque in the reel holder in the play-out direction, the second torque sensing means disabling the drive means if the fish tape becomes snagged during play-out;

a means for determining that take up of the fish tape is complete to disable the drive means; and means for attaching the frame to a standard electrical outlet box.

2. An automatic wire puller as defined in claim 1 wherein the constraining means comprises a spring urging the arm to a first rest position, and the first torque sensing means comprises means for sensing displacement of the arm from the rest position to a second torque position.

3. An automatic wire puller as defined in claim 1 wherein the means for constraining the fish tape handle has a first position constraining the handle and a second position releasing the handle.

4. An automatic wire puller as defined in claim 3 wherein the means for constraining the handle comprises a catch pivotally mounted to the frame for engaging the handle, means for releasably restraining the catch in the first position, and means for releasing the catch.

5. An automatic wire puller as defined in claim 4 wherein the means for determining that takeup of the fishtape is complete comprises:

a leader attached to the fish tape, means for sensing when the leader emerges from an electrical box, the sensing means operably connected to the releasing means for releasing the catch when the leader is sensed, and second sensing means mounted to the frame in spaced relation from the catch for sensing a desired final position of the handle upon rotation of the reel holder subsequent to release of the catch, the second sensing means connected to disable the drive means upon sensing the handle.

6. An automatic wire puller as defined in claim 3 wherein the second torque sensing means comprises means for sensing force on the constraining means rotationally opposite from the second position, the force sensing means connected to disable the drive means.

7. An automatic wire puller as defined in claim 1 wherein the means for attaching the frame comprises:

a rectangular spacer attached to the electrical box, a means for bearing support of the fish tape, the bearing means positionably mountable within the rectangular spacer, a means for aligning the reel holder with the bearing means, and a means for supporting the frame from the spacer.

8. An automatic wire puller as defined in claim 7 wherein the bearing means comprises:

horizontal support means connected to opposite sides of the rectangular spacer, a dolly having a side plate with first and second vertically spaced apertures, the dolly positionable on the support means, and a roller with an axle selectively mountable in the first and second apertures.

9. An automatic wire puller as defined in claim 1 further comprising:

a foot pivotally mounted to the frame and means for selectively securing the foot whereby the foot may be positioned against a wall to reduce the moment of the wire puller as attached to the outlet box or positioned to balance the wire puller on a floor.

10. An automatic wire puller for use with standard fish tape reels having a play out and take up handle and an axial multisided aperture in the reel case, the wire puller comprising:

a frame, a fish tape reel holder rotatably mounted to the frame, the reel holder having a plate and a plurality of support pins selectively mountable in a second plurality of spaced apertures drilled in the plate to match the intersection of the sides of the reel case aperture for several standard reel cases, the mounted support pins supporting the reel case, an arm pivotally mounted to the frame at the axis of rotation of the reel holder, a reversible electric motor mounted to the arm distal the pivot point, first control means mounted to the frame for providing power to the electric motor and selecting the first and second direction of operation of the motor, second control means remote from the frame for directing power to the electric motor and selecting the first and second direction of operation, the second control means having first momentary and continuous power controls for the first direction of operation and second momentary and continuous power controls for the second direction of operation, the second control means also having first means for indicating power to the second control means for the first direction, second means for indicating power to the second control means for the second direction, third means for indicating continuous operation in the first direction and fourth means for indicating continuous operation in the second direction, a means for selecting between the first control means and second control means, a sprocket driven by the motor, a plurality of drive pins mounted to the plate in spaced relation about the axis of rotation to engage the sprocket, a spring connected between the frame and the arm urging the arm to a first rest position against a stop mounted on the frame, a first micro-switch mounted to the frame in the arc of rotation of the arm to contact the arm at a second torqued position, means interconnecting the first micro-switch and motor for removing power to the motor upon contact of the micro-switch by the arm, means interconnecting the first micro-switch and the first indicator means for extinguishing the first indicator means upon contact of the micro-switch by the arm, a U-shaped clamp pivotally mounted at the base of the U to the frame and extending perpendicular thereto, the plane of the arms of the U tangent to the arc of rotation of the handle of the mounted fish tape reel, linkage means urging the clamp to an open position with the arms of the U parallel to the rotation of the handle, means for constraining the clamp in a closed position with the arms of the U perpendicular to the rotation of the handle, a second micro switch mounted to the frame proximate the linkage means for contact by the linkage means when the clamp is in the closed position, means interconnecting the second micro-switch and first control means for disabling the first control means in the first direction when the second micro-switch is contacted, a third micro-switch mounted to the frame proximate the linkage means for contact by the linkage means upon pivoting of the clamp beyond the closed position, means interconnecting the third micro-switch and the motor for removing power to the motor in the second direction when the third micro-switch is contacted, a slotted plate hingedly mounted to the frame and extending perpendicular thereto in a first closed position, the plate rotatable about the hinge to a second open position, the slot extending to an edge of the plate distal the hinge and having width greater than fish tape width and less than the width of a leader attached to the end of the tape, a means for releasably constraining the plate in the first closed position whereby the fish tape passing through the slot allows the slotted plate to remain in the closed position while the leader will be captured by the slot causing the slotted plate to rotate from the closed to the open position, a fourth micro-switch mounted to the frame proximate the slotted plate for contact by the plate in the closed position, means interconnecting the fourth micro-switch with the clamp constraining means for releasing the clamp upon contact of the fourth micro-switch, a second arm pivotally mounted to the frame about the axis of rotation of the reel holder, a fifth micro-switch mounted to the second arm at a radius from the axis of rotation slightly greater than the radius of the fish tape reel whereby the handle of the fish tape when released from the clamp will rotate in the second direction to contact the fifth micro-switch, means interconnecting the fifth micro-switch to the motor for interrupting power to the motor upon contact of the fifth micro-switch, and means for mounting the frame to a standard electrical box.

11. An automatic wire puller as defined in claim 10 further comprising a sixth micro-switch mounted to the frame proximate the slotted plate for contact by the slotted plate in the closed position and fifth indicator means connected to the sixth micro-switch whereby the fifth indicator means will indicate when the slotted plate is in the closed position.

* * * * *

UNITED STATES PATENT AND TRADEMARK OFFICE
CERTIFICATE OF CORRECTION

PATENT NO. : 4,917,362

DATED : April 17, 1990

INVENTOR(S) : Bruce Wilson

It is certified that error appears in the above-identified patent and that said Letters Patent is hereby corrected as shown below:

Column 3, line 38, after "FIG." insert -- 1 --.

Column 3, line 57, after "FIG." insert -- 1 --.

Column 5, line 20, before "fourth" insert -- a --.

Signed and Sealed this

Third Day of March, 1992

Attest:

HARRY F. MANBECK, JR.

*Attesting Officer*      *Commissioner of Patents and Trademarks*